Patented Apr. 27, 1926.

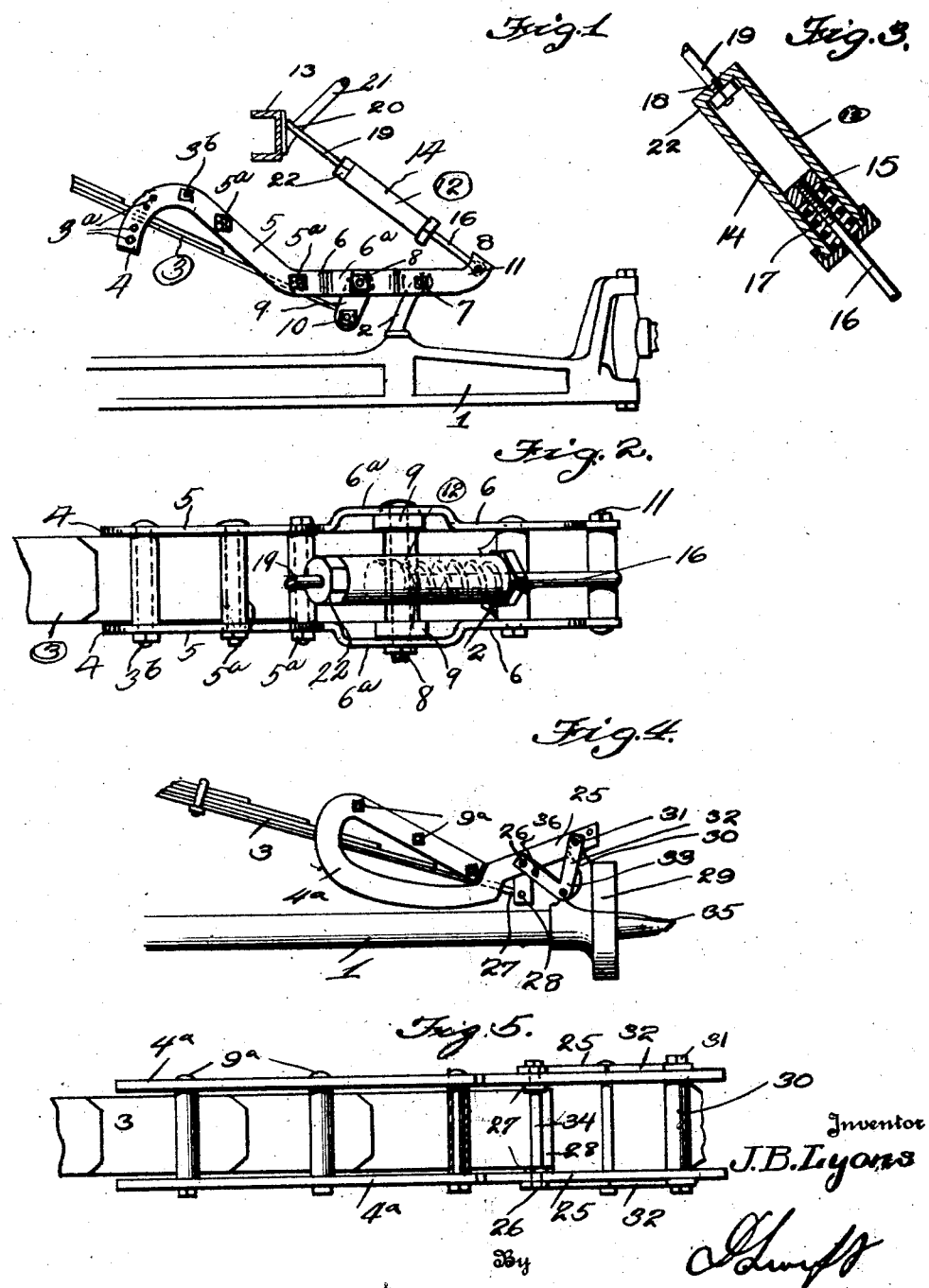

1,582,412

UNITED STATES PATENT OFFICE.

JOHN B. LYONS, OF NORPHLET, ARKANSAS.

SHOCK ABSORBER.

Application filed February 27, 1925. Serial No. 11,994.

*To all whom it may concern:*

Be it known that I, JOHN B. LYONS, a citizen of the United States, residing at Norphlet, in the county of Union, State of Arkansas, have invented a new and useful Shock Absorber; and I do hereby declare the following to be a full, clear, and exact description of the invention, such as will enable others skilled in the art to which it appertains to make and use the same.

The invention relates to shock absorbers for automobiles and has for its object to provide a device of this character, which may be easily and quickly attached to a conventional form of automobile without modifying the construction thereof, and provided with means whereby a snubbing action will take place on the ends of the spring during the bound or rebound of the body of the automobile when the automobile is going over rough ground or the wheels drop into a hole.

A further object is to provide a shock absorber comprising substantially horizontally disposed registering arms between which arms, adjacent their outer ends, a spring perch is pivotally connected, said arms having link connections with the end of a spring and at their inner ends terminating in upwardly, inwardly and downwardly extending registering arms at opposite sides of the spring and provided with transversely disposed bolts adapted to cooperate with the spring for snubbing the same during the bounding operation, said links allowing endwise movement of the ends of the spring during the flexing thereof.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a front elevation of a portion of an axle and automobile frame, showing the shock absorber applied thereto.

Figure 2 is a top plan view of the shock absorber and a portion of the spring.

Figure 3 is a longitudinal sectional view through the spring device for preventing excessive rocking of the automobile body.

Figure 4 is a view in elevation of a modified form of shock absorber for the rear axle and spring.

Figure 5 is a top plan view of the shock absorber shown in Figure 4.

Referring to the drawing, and particularly to Figures 1 to 3 inclusive the numeral 1 designates the front axle of a conventional form of automobile and 2 a spring perch carried thereby, which perch has been turned outwardly to space the same from the adjacent end of the spring 3. Disposed on opposite sides of the spring 3 are hook shaped members 4, which extend downwardly and register with each other. Hook shaped members 4 are provided with a plurality of apertures $3^a$ for the reception of a bolt $3^b$, which cooperates with the upper side of the spring for imparting a snubbing action thereon. Bolts may be placed through the apertures $3^a$ above and below the spring 3 if desired for holding the members more exact or the snubbing of the bound and rebound actions of the spring 3. The upper ends of the hooked members 4 are provided with downwardly and outwardly inclined registering arm 5, which terminate in substantially horizotally disposed registering arms 6. The arms 6 at a point spaced from their outer ends are pivotally connected at 7 to the spring perch 2, and the arms 6 intermediate their ends are provided with outwardly offset portions $6^a$ to the inner sides of which are pivotally connected by means of the bolt 8 downwardly extending links 9, to the lower ends of which the outer end of the spring 3 is pivotally connected at 10. The links 9 are spaced from the perch 2 and swing inwardly and outwardly during the flexing of the spring 3, therefore it will be seen that they will not interfere with the flexing operation of the spring. The downwardly and outwardly inclined arms 5 are provided with a plurality of alined transversely disposed bolts $5^a$, which bolts successively contact with and engage the upper side of the spring 3 for snubbing the spring upon the rebound, therefore it will be seen that the snubbing action of the bolts $5^a$ and also of the bolt $3^b$ will only be to the extent it is needed during the bound and rebound. The arms 6 extend beyond the pivotal point 7 and curve upwardly and have pivotally connected thereto at 11 an upwardly and inwardly inclined spring device 12, which spring device steadies the body 13 of the automobile, and prevents excessive rocking thereof. Spring device 12 comprises a cylinder 14, in which is slidably mounted an angularly shaped piston 15, and threaded through said piston is a threaded rod 16, which is pivoted at 11 to the outer ends of the arms 7. Interposed between the piston 15 and one end of the cylinder 14 is a coiled spring 17, which is compressed by the automobile body during a swaying operation, therefore it will be seen that the spring device will materially reduce the swaying of the automobile body. Threaded at 18 into one end of the cylinder 14 is a rod 19, which rod is connected at 20 to the fender brace 21 of the automobile body, therefore it will be seen that the spring device is not only connected to the arms 6, but also to the automobile body. Rods 16 and 19 are provided with oppositely disposed thread, consequently when a wrench is applied to the angularly shaped portion 22 of the cylinder 14, the cylinder can be rotated for varying the tension on the coiled spring 17.

Referring to Figures 4 and 5, the looped members 4ᵃ are provided; the action of which is substantially the same as the circular members 4 in Figure 1. The looped members 4ᵃ, however are provided with a plurality of transversely disposed bolts 9ᵃ, which successively come into engagement with the upper side of the spring 3 for snubbing the spring upon the rebound. Looped members 4ᵃ extend outwardly and upwardly and terminate in outwardly and upwardly extending arms 25 on the transversely disposed pin 26 of which downwardly extending links 27 are pivotally mounted, and to the lower ends of which links, the outer end of the spring 6 is connected at 28. By providing the links 27, the ends of the spring may move freely outwardly during a flexing operation, which is particularly desirable upon excessive loads. Extending upwardly and inwardly from the brake drum housing 29 is an arm 30, and to which arm is pivotally connected at 31 oppositely disposed registering V-shaped brackets 32, which brackets have their apex ends 33 downwardly disposed and connected together by a transversely disposed bolt 34, which bolt during the rebound action of the spring 3 engages the brake drum housing 29 at 35, thereby placing the strain on the housing 29 at a point where the housing is relatively strong. The V-shaped members 32 are also connected to the bolt 26, therefore it will be seen that the V-shaped brackets are rigidly connected to the arms 25. V-shaped brackets 32 are provided with apertures 36 for the reception of the bolt 26 when a different adjustment is desired.

From the above it will be seen that a shock absorber is provided for automobiles, wherein a positive snubbing action of the spring will take place upon the bound and rebound action, the shock absorber simple in construction, and constructed in a manner whereby it may be easily and quickly applied to an automobile spring and axle without varying the construction thereof.

The invention having been set forth what is claimed as new and useful is:—

The combination with a spring perch, a spring arm adjacent the inner side of said perch, an automobile body, of a shock absorber, said shock absorber comprising substantially horizontally disposed registering arms pivotally connected to the perch, downwardly extending links pivoted to the registering arms and pivotally connected to the spring end, the inner ends of the registering arms terminating in upwardly, inwardly and downwardly registering members at opposite sides of the spring end, a plurality of spaced bolts connecting said members together and adapted to engage successively the upper side of the spring end, said registering arms extending outwardly beyond the perch, and a spring device connecting the outer ends of the arms and the automobile body.

In testimony whereof I have signed my name to this specification.

JOHN B. LYONS.